(12) United States Patent
Gottschall et al.

(10) Patent No.: US 11,211,762 B2
(45) Date of Patent: Dec. 28, 2021

(54) GENERATING SYNCHRONIZED LASER PULSES AT VARIABLE WAVELENGTHS

(71) Applicants: Fraunhofer-Gesellschaft zur Förderung der Angewandten Forschung E.V., Munich (DE); Friedrich-Schiller-Universität Jena, Jena (DE); Leibniz-Institut Für Photonische Technologien E.V., Jena (DE)

(72) Inventors: Thomas Gottschall, Jena (DE); Jens Limpert, Jena (DE); Andreas Tünnermann, Weimar (DE); Tobias Meyer, Jena (DE); Jürgen Popp, Jena (DE)

(73) Assignees: Fraunhofer-Gesellschaft zur Förderung der angewandten Forschung e.V., Munich (DE); Friedrich-Schiller-Universität Jena, Jena (DE); Leibniz-Institut Für Photonische Technologien E.V., Jena (DE)

( * ) Notice: Subject to any disclaimer, the term of this patent is extended or adjusted under 35 U.S.C. 154(b) by 61 days.

(21) Appl. No.: 16/630,545

(22) PCT Filed: Jul. 12, 2018

(86) PCT No.: PCT/EP2018/068875
§ 371 (c)(1),
(2) Date: Jan. 13, 2020

(87) PCT Pub. No.: WO2019/012020
PCT Pub. Date: Jan. 17, 2019

(65) Prior Publication Data
US 2021/0091527 A1    Mar. 25, 2021

(30) Foreign Application Priority Data

Jul. 12, 2017    (DE) .................... 10 2017 115 687.9

(51) Int. Cl.
*H01S 3/00*    (2006.01)
*H01S 3/094*    (2006.01)
(Continued)

(52) U.S. Cl.
CPC ...... *H01S 3/0092* (2013.01); *H01S 3/094076* (2013.01); *H01S 3/1083* (2013.01); *H01S 3/1106* (2013.01)

(58) Field of Classification Search
CPC .. G02F 1/395; H01S 3/0092; H01S 3/094076; H01S 3/1106
See application file for complete search history.

(56) References Cited

FOREIGN PATENT DOCUMENTS

WO    WO 2019/012020    1/2019

OTHER PUBLICATIONS

Eibl, "Hyperspectral stimulated Raman microscopy with two fiber laser sources," 2015, Advanced Microscopy Techniques IVV; and Neurophotonics II, Proc. SPIE 9536, European Conferences on Biomedical Optics, 953604-1-953604-6. (Year: 2015).*

(Continued)

*Primary Examiner* — Michael Carter

(57) ABSTRACT

The invention relates to an apparatus for generating laser pulses. It is an object of the invention to provide a method for generating synchronized laser pulse trains at variable wavelengths (e.g., for coherent Raman spectroscopy/microscopy), wherein the switching time for switching between different wavelengths should be in the sub-µs range. For this purpose the apparatus according to the invention comprises a pump laser (1), which emits pulsed laser radiation at a specified wavelength, (Continued)

an FDML laser (3), which emits continuous wave laser radiation at a cyclically variable wavelength, and a nonlinear conversion medium (4), in which the pulsed laser radiation of the pump laser (1) and the continuous wave laser radiation of the FDML laser (3) are superposed. In the nonlinear conversion medium (4) the pulsed laser radiation of the pump laser (1) and the continuous wave laser radiation of the FDML laser (3) are converted in an optical parametric process into pulsed laser radiation at a signal wavelength and an idler wavelength that differs therefrom. Furthermore the invention relates to a method for generating laser pulses.

12 Claims, 3 Drawing Sheets

(51) Int. Cl.
*H01S 3/108* (2006.01)
*H01S 3/11* (2006.01)

(56) References Cited

OTHER PUBLICATIONS

Zhang, "Fiber-Optical Parametric Amplifier With High-Speed Swept Pumpm," 2011, IEEE Photonics Technology Letters, vol. 23, No. 14, 1022-1024 (Year: 2011).*

Internationaler Recherchenbericht udn Schriftlicher Bescheid [International Search Report and the Written Opinion] dated Oct. 22, 2018 From the International Searching Authority Re. Application No. PCT/EP2018/068875 and Its Translation of Search Report Into English. (13 Pages).

Eibl et al. "Hyperspectral Stimulated Raman Microscopy With Two Fiber Laser Sources", Advanced Microscopy Techniques IV and Neurophotonics II, Proceedings of the SPIE-OSA, European Conference on Biomedical Optics, 9536: 953604-1-353604-6, Published Online Jun. 21, 2015.

Zhang et al. "Fiber-Optical Parametric Amplifier With High-Speed Swept Pump", IEEE Photonics Technology Letters, 23(14): 1022-1024, May 10, 2011.

Zhu et al. "Dual-Band Time-Multiplexing Swept-Source Optical Coherence Tomography Based on Optical Parametric Amplification", IEEE Journal of Selected Topics in Quantum Electronics, 18(4): 1287-1292, Sep. 6, 2011.

* cited by examiner

GENERATING SYNCHRONIZED LASER PULSES AT VARIABLE WAVELENGTHS

RELATED APPLICATIONS

This application is a National Phase of PCT Patent Application No. PCT/EP2018/068875 having International filing date of Jul. 12, 2018, which claims the benefit of priority of German Patent Application No. 10 2017 115 687.9 filed on Jul. 12, 2017. The contents of the above applications are all incorporated by reference as if fully set forth herein in their entirety.

FIELD AND BACKGROUND OF THE INVENTION

The invention relates to an apparatus and a method for generating laser pulses.

For coherent Raman spectroscopy/microscopy (CRS), two synchronized laser pulse trains with repetition rates of a few MHz to a few tens of MHz are required. The energy gap between the central wavelengths of the two laser pulse trains thereby must correspond to the Raman resonant energies of the molecules under investigation. In order to be able to address a plurality of resonant energies and consequently different types of molecules, the energy gap between the two laser pulse trains must be variable. In addition, the laser pulses must have a peak power of more than 1 kW so that the resulting measurement signals are low-noise. Since simultaneously the average power (e.g., for use on living tissue) should not exceed the mW range, very short laser pulses (pulse duration between 5 ps and 50 ps) must be used to provide the required pulse peak power. In addition, the spectral bandwidth of the laser pulses for CRS must be less than 10 $cm^{-1}$ (i.e., less than 1 nm at 1000 nm central wavelength). Since the spectral bandwidth of a transform-limited laser pulse is inversely proportional to the pulse duration, the pulse duration is not allowed to fall below a specified minimum value. The central wavelengths of the laser pulses are mostly chosen in the near infrared range, because the absorption in this range is low and the diffraction-limited spatial resolution is high. Accordingly, the laser pulses should not fall below a minimum pulse duration of approx. 1 ps, to satisfy the requirements for the spectral resolution in the case of transform-limited bandwidth. The use of laser pulses in the range of 0.5-100 ps is therefore a compromise of a high spectral resolution of the Raman resonances and the generation of low-noise measurement signals by the excitation with a high pulse peak power at a tolerable average power.

A structure based on optical fibers, which generates synchronized pulse trains with the abovementioned parameters, is known from WO 2015/063063 A1. The structure comprises an optical parametric oscillator (OPO) based on four wave mixing. The OPO converts a portion of the light into laser pulses at a shorter wavelength (signal wavelength) and another portion into laser pulses at a long wavelength (idler wavelength), dependent on the wavelength and the repetition frequency of the pump laser. The thus generated laser pulse trains are inherently synchronized and can be used for (imaging) CRS methods.

In laser scanning microscopy based on the CRS method the synchronized pulse trains are focused on a biological sample, which is spatially scanned for generation of an image in a plane by virtue of the focus being moved in a grid shape in two dimensions over the sample. Thus e.g. a spatial concentration distribution of molecules at a specified Raman resonance can be investigated. For identification and microscopic measurement of the spatial distribution of different molecules, e.g. for classification of tissues types, it is necessary to measure the sample at different Raman resonances. Because the image-wise measurement of the sample at different resonances of living tissue and in vivo is difficult due to movement artefacts, a quick switching between the Raman resonances, e.g. a quick switching between different wavelengths of the laser pulses, is desirable.

M. A. B. Rinkmann et al. ("Electronically and rapidly tunable fiber-integrable optical parametric oscillator for non-linear microscopy," Opt. Lett. 41, 2193-2196, 2016) propose generating different repetition rates of the pump laser pulses with a fast electro-optic modulator (EOM) in an OPO-concept, to be able to switch between different resonances in less than 8 µs in this way. Here, the switching time of the EOM and the settling time of the utilized fiber-OPO limit the switching time. With the previously known method the measurement of two Raman resonances at a rate of 62.5 kHz is possible. A microscopic image can thereby be obtained with a resolution of 500×500 pixels every 4 s.

SUMMARY OF THE INVENTION

Against this background, it is an object of the invention to provide a method for generating synchronized laser pulse trains at variable wavelengths, wherein the switching time for switching between different wavelengths is in the sub-µs range.

This invention achieves this object by an apparatus for generating laser pulses, comprising a pump laser, which emits pulsed laser radiation at a specified wavelength, an FDML laser, which emits continuous wave laser radiation at a cyclically variable wavelength, and a nonlinear conversion medium, in which the pulsed laser radiation of the pump laser and the continuous wave laser radiation of the FDML laser are superposed.

Nowadays the fastest method to change the wavelength of a continuous wave laser constitutes the Fourier domain mode-locking laser (here shortened to: FDML laser) (see R. Huber et al., "Fourier Domain Mode Locking (FDML): a new laser operating regime and applications for optical coherence tomography", 14, 1981-1983, 2006). This laser can be driven through its entire tuning range in a time period of less than 100 ns. According to the invention the radiation of such an FDML laser is superposed with the radiation of a short pulse laser, used as a pump laser, in a nonlinear conversion medium, where parametric amplification takes place with difference frequency generation (e.g., in a birefringent crystal) or with four wave mixing (e.g., in a suitable optical fiber). The continuous wave laser radiation, which is superposed in the nonlinear conversion medium with the pulsed pump radiation, is amplified within the amplification range/phase matching range of the respective parametric processes, and signal and idler pulses are formed, which take on the approximate length of the pump pulses. Through the combination according to the invention of the FDML laser and the optical parametric wavelength converter, the central wavelength can be varied from pulse to pulse within the amplification bandwidth of the parametric processes or the tuning range of the FDML laser. The minimum switching time is limited thereby only by the repetition rate of the pump laser. Switching times significantly below 1 µs can be reached thereby. This makes the recording of a complete image by means of CRS laser scanning microscopy possible with two or more Raman resonances in less than 1 s.

In a preferred embodiment of the apparatus according to the invention, an optical amplifier is arranged in the beam path between the pump laser and the nonlinear conversion medium, which optical amplifier amplifies the laser radiation of the pump laser. In this way, a sufficient intensity of the laser radiation of the pump laser, which drives the nonlinear conversion process, is ensured.

The nonlinear conversion medium of the apparatus according to the invention is preferably a microstructured optical fiber, a fundamental-mode fiber, a multimode fiber, a periodically polarized birefringent crystal, a birefringent crystal, a hollow-core fiber filled with nobel gas, a kagome fiber filled with nobel gas (see F. Couny et al. "Large-pitch kagome-structured hollow-core photonic crystal fiber", Opt. Lett. 31, 3574-3576, 2006) or a "negative curvature" fiber filled with nobel gas (see F. Yu et al., "Negative curvature hollow core optical fiber", IEEE J. Sel. Top. Quantum Electron. 22: 4400610, 2016).

In the apparatus according to the invention, the pump laser generates the laser pulses advantageously with a repetition rate in the range of 1 kHz to 1 GHz and a pulse duration in the range of 1 µs to 10 fs. The repetition rate of the pump laser determines the switching time between different wavelengths, as explained above. The pulse duration is chosen according to the requirements of the application.

The invention furthermore relates to a method for generating laser pulses, comprising at least the following steps:
generating pulsed laser radiation at a specified wavelength with a pump laser,
generating continuous wave laser radiation at a cyclically variable wavelength with an FDML laser, and
superposing the pulsed laser radiation of the pump laser and the continuous wave laser radiation of the FDML laser in a nonlinear conversion medium, wherein the pulsed laser radiation of the pump laser and the continuous wave laser radiation of the FDML laser are converted in an optical parametric process into pulsed laser radiation at a signal wavelength and an idler wavelength that differs therefrom.

Hereinafter $f_{FDML}$ denotes the frequency of the cyclical wavelength change of the FDML laser, i.e. the repetition rate of full frequency cycles, and $f_{pump}$ denotes the repetition rate of the pump laser, which drives the nonlinear conversion.

With the method according to the invention it is possible, in principle, to distinguish between three operating modes.

In the first operating mode the frequency of the cyclical wavelength change of the FDML laser is equal to an integer multiple of the repetition rate of the laser pulses of the pump laser. So in this operating mode $f_{FDML} - f_{pump}$ 0 is true. Thereby the same spectral part is always selected by the pump pulses from the radiation of the FDML laser, which is cyclically variable with respect to the wavelength. Thus a signal pulse train and an idler pulse train with a time-constant central wavelength in each case are formed. Thereby the absolute phase difference between the tuning cycle of the FDML laser and the pulse repetition of the pump laser at the superposition location in the nonlinear conversion medium determines the central wavelengths of the signal and idler pulses.

In the second operating mode the frequency of the cyclical wavelength change of the FDML laser is not equal to an integer multiple of the repetition rate of the laser pulses of the pump laser. So $f_{FDML} - n \cdot f_{pump} \neq 0$ is true. Thereby the continuous wave laser radiation of the FDML laser, which varies cyclically with respect to the wavelength, is sampled with the pump repetition rate $f_{pump}$, wherein every emerging signal and idler pulse is generated at a different central wavelength. The beat frequency $|f_{FDML} - f_{pump}| = f_s$ is the frequency that the tuning cycle of the signal and idler pulses repeats at.

In the third operating mode the difference of the frequency of the cyclical wavelength change of the FDML laser and the repetition rate of the laser pulses of the pump laser is equal to an integer multiple of the frequency of the cyclical wavelength change of the FDML laser. So it is true that $f_{FDML} - f_{pump} = n \cdot f_{FDML}$ (n is a natural number). In this operating mode n different central wavelengths of the FDML radiation are chosen and successively converted into signal and idler pulses. In this way, for e.g. n=2, two Raman resonances can be sampled alternately.

BRIEF DESCRIPTION OF THE SEVERAL VIEWS OF THE DRAWINGS

Exemplary embodiments of the invention will be explained in more detail below with reference to the drawings. In the figures.

DESCRIPTION OF SPECIFIC EMBODIMENTS OF THE INVENTION

Figure 1:
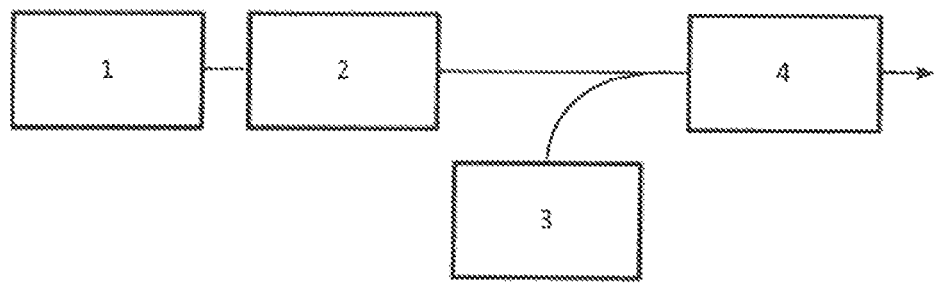
FIG. 1 shows an apparatus according to the invention as a block diagram.

FIG. 1 schematically shows an apparatus according to the invention as a block diagram. It comprises a pump laser 1, e.g. a mode-coupled fiber laser, which generates laser pulses with a duration of approx. 30 ps at a repetition rate of approx. 20 MHz. The wavelength of the pulsed laser radiation is fixedly specified. The pulsed laser radiation of the pump laser 1 is amplified by an optical amplifier 2, e.g. a diode-pumped amplifier fiber. Furthermore the apparatus comprises an FDML laser 3, which generates continuous wave laser radiation at a cyclically variable wavelength. The output of the optical amplifier 2 and the output of the FDML laser 3 are connected via optical fibers to a nonlinear conversion medium 4, e.g. a microstructured optical fiber, so that the amplified laser pulses of the pump laser 1 and the laser radiation of the FDML laser 3 are superposed in the nonlinear conversion medium 4. In these the pulsed laser radiation of the pump laser 1 and the continuous wave laser radiation of the FDML laser 3 are converted in an optical parametric process, e.g. by four wave mixing, into pulsed laser radiation at a signal wavelength and an idler wavelength that differs therefrom, which exits the apparatus at the output of the nonlinear medium 4 (in FIG. 1 to the right) and can be used for e.g. CRS microscopy. On the basis of the cyclical change of the wavelength of the radiation of the FDML laser 3, the central wavelength of the signal or idler pulses is varied from pulse to pulse within the amplification bandwidth of the parametric process and according to the tuning range of the FDML laser 3.

In the diagrams of FIG. 2-5 the cyclical variation of the continuous wave laser radiation of the FDML laser 3 in the wavelength range between λmin and λmax is illustrated as a function of time (in units of the inverse frequency $f_{FDML}$ of the cyclical wavelength change of the FDML laser 3). The vertical, dashed lines show the sampling of the radiation of the FDML laser 3 with the radiation of the pump laser 1 in the nonlinear conversion medium 4 at the frequency $f_{pump}$ at the corresponding discrete time.

Figure 2:
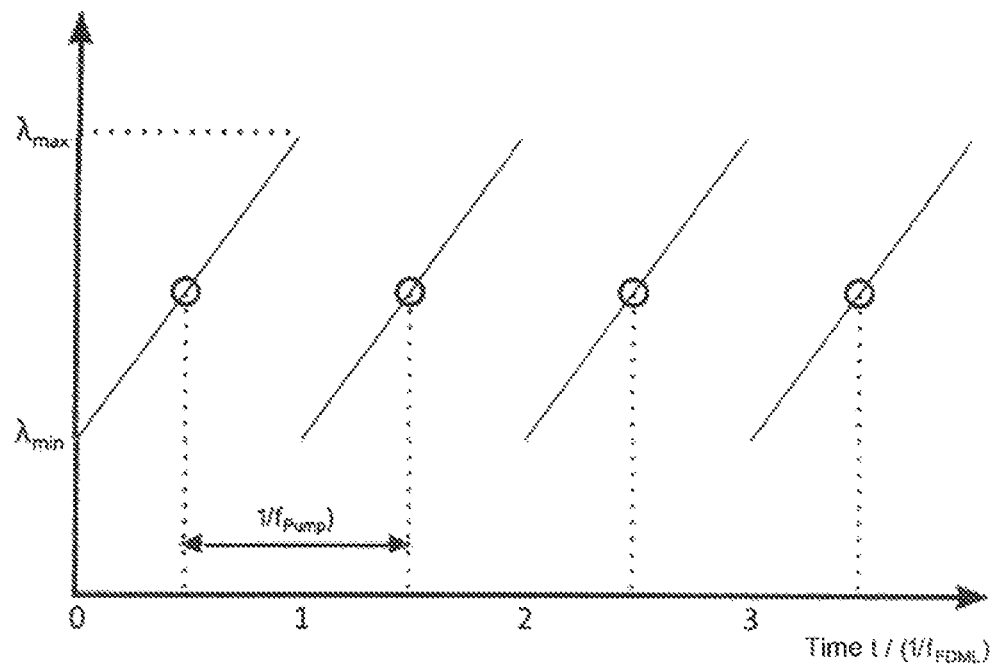
FIG. 2 shows an illustration of the method according to the invention in a first operating mode.

In the example shown in FIG. 2 the frequency of the cyclical wavelength change of the FDML laser is equal to the repetition rate of the laser pulses of the pump laser. So $f_{FDML}-f_{pump}=0$ is true. Then the same spectral part is always selected by the pump pulses from the radiation of the FDML laser 3, which is cyclically variable with respect to the wavelength. Thus a signal pulse train and an idler pulse train with a time-constant central wavelength in each case are formed. The phase difference between the tuning cycle of the FDML laser 3 and the pulse repetition of the pump laser 1 thereby determines the central wavelengths of the signal and idler pulses.

Figure 3:
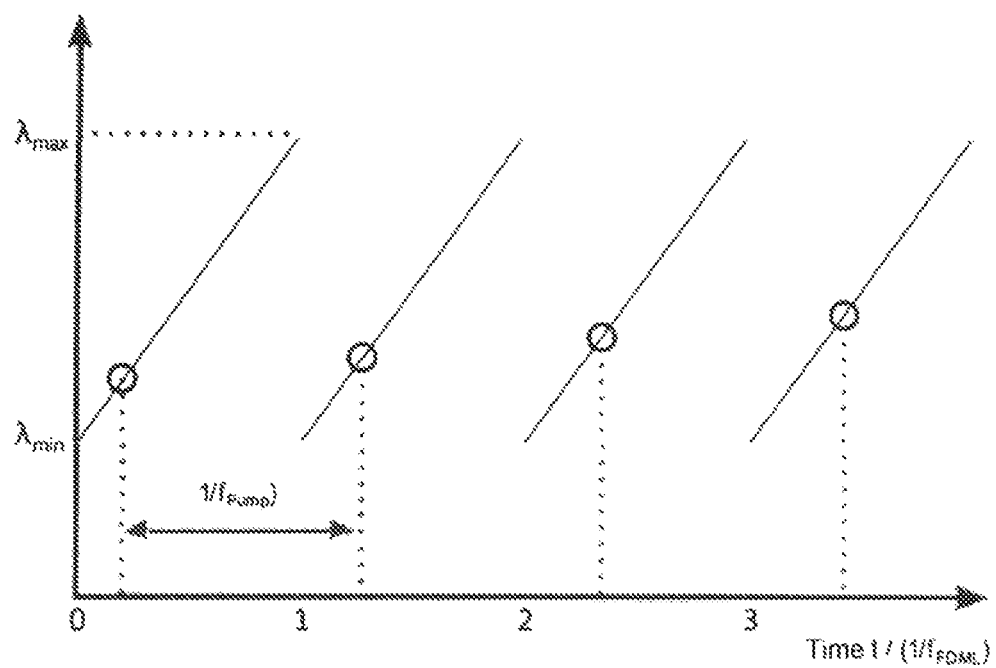
FIG. 3 shows an illustration of the method according to the invention in a second operating mode.

In FIG. 3 the frequency of the cyclical wavelength change of the FDML laser 3 is not equal to an integer multiple of the repetition rate of the laser pulses of the pump laser 1. So $f_{FDML}-n \cdot f_{pump} \neq 0$ is true (where n is a natural number). Thereby the continuous wave laser radiation of the FDML laser 3, which varies cyclically with respect to the wavelength, is sampled with the pump repetition rate $f_{pump}$, wherein every emerging signal and idler pulse forms at a different central wavelength.

Figure 4:
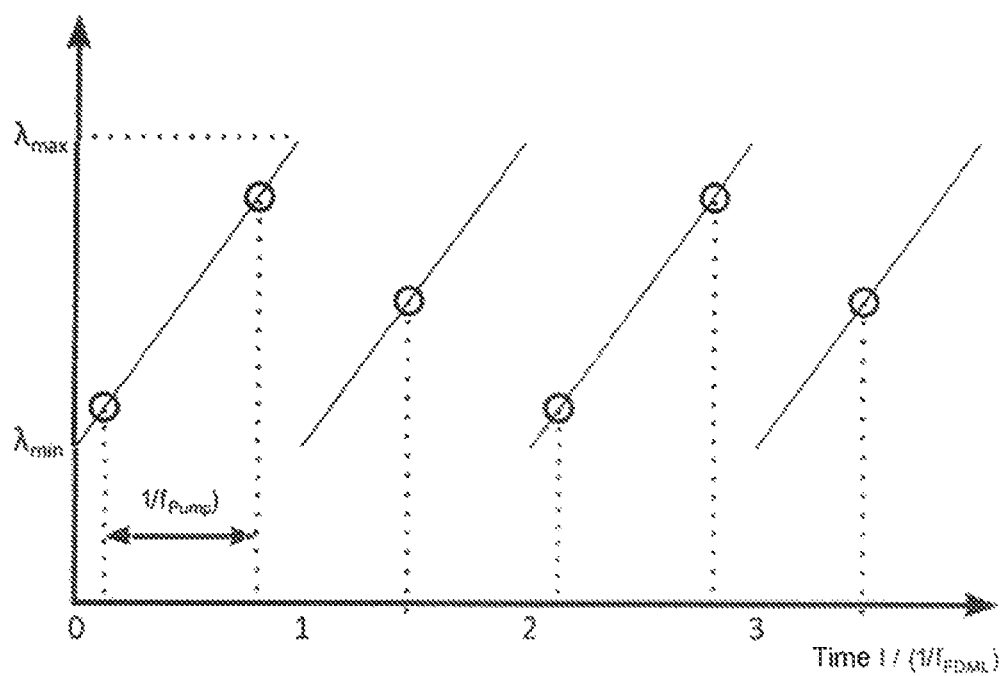
FIG. 4 shows an illustration of the method according to the invention in a variation of the second operating mode.

FIG. 4 shows a variation of the operating mode presented in FIG. 3. In FIG. 4, $n \cdot f_{FDML}-m \cdot f_{pump}=0$ is true (where n and m are natural numbers). Specifically, n=2 and m=3 in the presented case. In this case three different signal and idler wavelengths result, consecutively in time.

Figure 5:
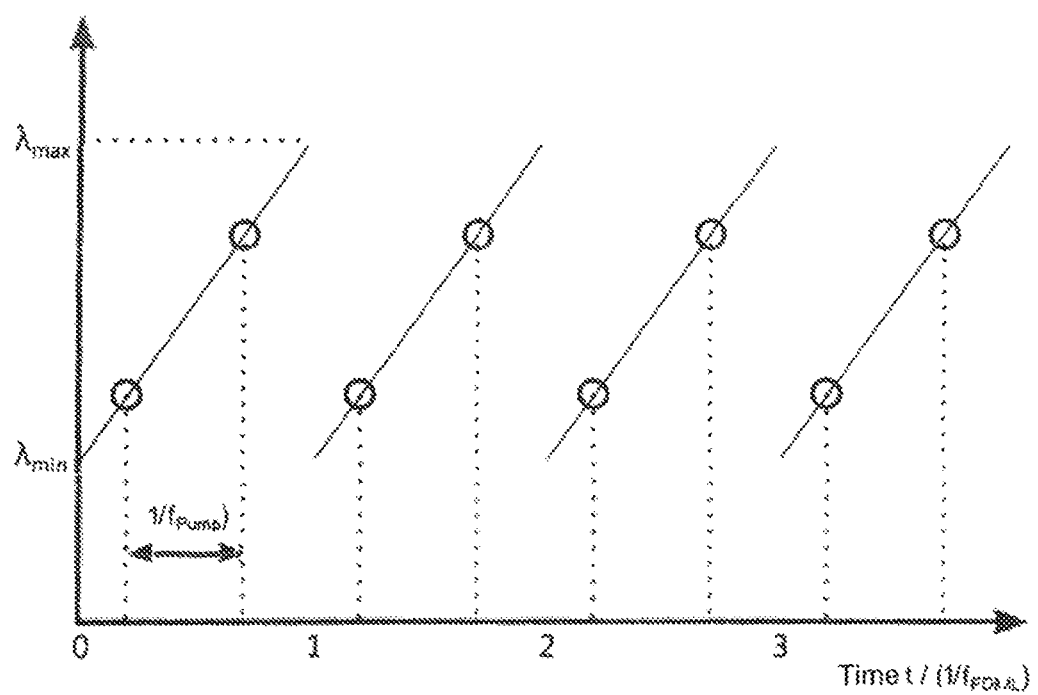
FIG. 5 shows an illustration of the method according to the invention in a third operating mode.

In the operating mode shown at the end in FIG. 5, the difference of the frequency of the cyclical wavelength change of the FDML laser and the repetition rate of the laser pulses of the pump laser is equal to an integer multiple of the frequency of the cyclical wavelength change of the FDML laser. So $f_{FDML}-f_{pump}=n \cdot f_{FDML}$ is true. In this operating mode n different central wavelengths of the FDML radiation are chosen and successively converted into signal and idler pulses. In this way, for the presented case with n=2, two wavelengths are selected alternately.

In the diagrams of FIG. 2-5 the temporal profile of the wavelength of the radiation of the FDML laser has a sawtooth-shaped characteristic. Another curve profile is readily conceivable, without thereby changing something about the functional principle of the invention. In FIG. 3 the sawtooth-shaped characteristic ensures that the successively selected wavelengths are equidistant.

What is claimed is:

1. An apparatus for generating laser pulses, comprising:
   a pump laser, which emits pulsed laser radiation at a specified wavelength,
   an FDML laser, which emits continuous wave laser radiation at a cyclically variable wavelength, and
   a nonlinear conversion medium, in which the pulsed laser radiation of the pump laser and the continuous wave laser radiation of the FDML laser are superposed, whereby signal and idler pulses at different wavelengths are formed in an optically parametric process within a gain and phase matching range.

2. The apparatus as claimed in claim 1, wherein an optical amplifier is arranged in the beam path between the pump laser and the nonlinear conversion medium, which optical amplifier amplifies the laser radiation of the pump laser.

3. The apparatus as claimed in claim 1, wherein the nonlinear conversion medium is a microstructured optical fiber, a fundamental-mode fiber, a multimode fiber, a periodically polarized birefringent crystal, a birefringent crystal, a hollow-core fiber filled with nobel gas, a kagome fiber filled with nobel gas or a "negative curvature" fiber filled with nobel gas.

4. The apparatus as claimed in claim 1, wherein the pump laser emits laser pulses with a repetition rate in the range of 1 kHz to 1 GHz and a pulse duration in the range of 1 μs to 10 fs.

5. A method for generating laser pulses, comprising least the following steps:
   generating pulsed laser radiation at a specified wavelength with a pump laser, generating continuous wave laser radiation at a cyclically variable wavelength with an FDML laser, and
   superposing the pulsed laser radiation of the pump laser and the laser radiation of the FDML laser in a nonlinear conversion medium, wherein signal and idler pulses at different wavelengths are formed in an optically parametric process within a gain and phase matching range.

6. The method as claimed in claim 5, wherein the optical parametric process is based on difference frequency generation or on four wave mixing.

7. The method as claimed in claim 5, wherein the pulsed laser radiation of the pump laser before the superposition with the continuous wave laser radiation of the FDML laser is amplified by an optical amplifier.

8. The method as claimed in claim 5, wherein the repetition rate of the laser pulses of the pump laser is in the range of 1 kHz to 1 GHz and the pulse duration is in the range of 1 μs to 10 fs.

9. The method as claimed in claim 5, wherein the frequency of the cyclical wavelength change of the FDML laser is equal to an integer multiple of the repetition rate of the laser pulses of the pump laser.

10. The method as claimed in claim 5, wherein the frequency of the cyclical wavelength change of the FDML laser is not equal to an integer multiple of the repetition rate of the laser pulses of the pump laser.

11. The method as claimed in claim 5, wherein the difference of the frequency of the cyclical wavelength change of the FDML laser and the repetition rate of the laser pulses of the pump laser is equal to an integer multiple of the frequency of the cyclical wavelength change of the FDML laser.

12. A method, comprising: using an apparatus as claimed in claim 1 as a light source for generating synchronized laser pulse trains of variable wavelength in coherent Raman spectroscopy or microscopy.

* * * * *